US009665844B2

(12) United States Patent
Dakshinamurthy (10) Patent No.: US 9,665,844 B2
(45) Date of Patent: May 30, 2017

(54) COMPLEX DECISION MAKING AND ANALYSIS

(71) Applicant: International Business Machines Corporation, Armonk, NY (US)

(72) Inventor: Karthikeyan Dakshinamurthy, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 14/270,823

(22) Filed: May 6, 2014

(65) Prior Publication Data

US 2015/0324360 A1    Nov. 12, 2015

(51) Int. Cl.
*G06F 17/30* (2006.01)
*G06Q 10/06* (2012.01)

(52) U.S. Cl.
CPC ..... *G06Q 10/0637* (2013.01); *G06F 17/3053* (2013.01); *G06F 17/30864* (2013.01)

(58) Field of Classification Search
USPC ............... 707/609, 687, 705, 790, 813, 821
See application file for complete search history.

(56) References Cited

U.S. PATENT DOCUMENTS

| | | | |
|---|---|---|---|
| 6,850,891 B1 * | 2/2005 | Forman | G06Q 10/063 705/7.11 |
| 7,630,930 B2 | 12/2009 | Almgren et al. | |
| 7,756,781 B2 | 7/2010 | Lent et al. | |
| 8,554,912 B1 * | 10/2013 | Reeves | G06F 21/552 455/410 |
| 2002/0128892 A1 | 9/2002 | Farenden | |
| 2010/0063830 A1 * | 3/2010 | Kenedy | G06Q 50/22 705/2 |
| 2011/0112882 A1 | 5/2011 | Summers | |
| 2012/0029965 A1 | 2/2012 | Steffen et al. | |

OTHER PUBLICATIONS

Archer et al., "An integrated framework for project portfolio selection," International Journal of Project Management, 1999, pp. 207-216, vol. 17, Issue 4, Copyright 1999 Published by Elsevier Science Ltd and IPMA.

(Continued)

*Primary Examiner* — Sana Al Hashemi
(74) *Attorney, Agent, or Firm* — Mark G. Edwards (57) ABSTRACT

A computer system can analyze a set of prioritization scores corresponding to respective scored entities and developed from criteria comparison matrices that compare how well pairs of scored entities match respective criteria. The set of prioritization scores can be retrieved from a database. The computer system can determine a numerical difference between a first prioritization score of a scored entity and a threshold prioritization score. A plurality of state changes to the criteria comparison matrices can be used to determine corresponding changes to the first prioritization score. Based upon a comparison between the changes to the first prioritization score and the numerical difference, a subset of the plurality of state changes can be selected. An electronic recommendation message can be generated from a set of criteria for improving the prioritization score for the at least one scored entity.

17 Claims, 6 Drawing Sheets

(56) References Cited

OTHER PUBLICATIONS

Keisler, J., "Value of Information in Portfolio Decision Analysis," Decision Analysis, Sep. 2004, pp. 177-189, vol. 1, Issue 3, © 2004 Informs. D.O.I. 10.1287/deca.1040.0023.

Liesio, J., "Portfolio Decision Analysis for Robust Project Selection and Resource Allocation," Systems Analysis Laboratory Research Reports, Oct. 2008.

Linton et al., "Analysis, ranking and selection of R&D projects in a portfolio," R&D Management, Mar. 2002, pp. 139-148, vol. 32, Issue 2. D.O.I. 10.1111/1467-9310.00246.

Oracle, "Overview of Oracle Project Portfolio Analysis," Oracle Project Portfolio Analysis User Guide, © 2005, 2010 Oracle and/or its affiliates.

Unknown, "Analytic hierarchy process," Wikipedia the free encyclopedia, last modified Dec. 11, 2013. http://en.wikipedia.org/wiki/Analytic_hierarchy_process.

Unknown, "International Society on Multi-criteria Decision Making," Wikipedia the free encyclopedia, last modified Jul. 29, 2011. http://en.wikipedia.org/wiki/International_Society_on_Multi-criteria_Decision_Making.

Unknown, "Thomas L. Saaty," Wikipedia the free encyclopedia, last modified Sep. 4, 2013. http://en.wikipedia.org/wiki/Thomas_L._Saaty.

Unknown, "Weighted Product Model," Wikipedia the free encyclopedia, last modified on Jul. 15, 2013. http://en.wikipedia.org/wiki/Weighted_product_model.

Unknown, "Weighted Sum Model," Wikipedia the free encyclopedia, last modified Oct. 1, 2013. http://en.wikipedia.org/wiki/Weighted_sum_model.

Haas et al., "An Illustrated Guide to the Analytic Hierarchy Process," Institute of Marketing & Innovation, University of latural Resources and Applied Life Sciences, Vienna, 2005, 20 pages http://www.boku.ac.at/mi/ahp/ahptutorial.pdf.

* cited by examiner

| Strategic Alignment 302 | | | | | |
|---|---|---|---|---|---|
| | Entity 1 | Entity 2 | Entity 3 | Entity 4 | |
| Entity 1 | 1 | 3 | 5 | 7 | |
| Entity 2 | 0.333 | 1 | 7 | 7 | |
| Entity 3 | 0.2 | 3 | 1 | 2 | 306 |
| Entity 4 | 0.1429 | 0.1429 | 0.5 | 1 | |
| | 1.6762 | 7.1429 | 6.8333 | 17 | |

304

| | Entity 1 | Entity 2 | Entity 3 | Entity 4 | |
|---|---|---|---|---|---|
| | 0.5966 | 0.42 | 0.7317 | 0.4118 | |
| | 0.1989 | 0.14 | 0.0488 | 0.4118 | 308 |
| | 0.1193 | 0.42 | 0.1463 | 0.1176 | |
| | 0.0852 | 0.02 | 0.0732 | 0.0588 | |
| | 1.000 | 1.000 | 1.000 | 1.000 | |

| Prioritization Vector | |
|---|---|
| 0.540 | |
| 0.200 | |
| 0.201 | 310 |
| 0.059 | |
| 1.000 | |

Total Prioritization Vector

| Proposals | Total Prioritization Score |
|---|---|
| Entity 1 | 0.548 |
| Entity 2 | 0.196 |
| Entity 3 | 0.170 |
| Entity 4 | 0.086 |

Selection Cutoff

COMPLEX DECISION MAKING AND ANALYSIS

BACKGROUND

The present disclosure relates to computerized complex decision making processes, and more specifically, to generating feedback and recommendations for participants scored as part of the decision making process.

Computerized processes and algorithms can be used in automated decision making processes. The use of powerful computers and complex analysis algorithms can allow for decisions to be made based upon a large number of different criteria. The use of such computers can improve upon the objectiveness of the selection process by breaking the decision down into a set of individually manageable criteria, thereby, allowing decision makers to provide input on the criteria separate from the final decision. The different criteria can each have different weights and be assessed differently for each alternative option for selection by the decision making process. The results of the decision making process can be a powerful tool that allows for intelligent selection decisions to be made for the alternative options. A more nuanced and usefulness selection decision can be achieved by using more complex sets of input data with more criteria and more information about the criteria and alternative options.

SUMMARY

Consistent with embodiments, a computer-implemented method includes analyzing a set of prioritization scores corresponding to respective scored entities and developed from criteria comparison matrices that compare how well pairs of scored entities match respective criteria. A computer system accesses a database to retrieve the set of prioritization scores and determines, for at least one of the scored entities and based upon the retrieved set of prioritization scores, a numerical difference between a first prioritization score of the at least one scored entity and a threshold prioritization score. The computer system can also determine, for a plurality of state changes to the criteria comparison matrices, corresponding changes to the first prioritization score and then select, based upon a comparison between the changes to the first prioritization score and the numerical difference, a subset of the plurality of state changes. Using the subset of the plurality of state changes, an electronic recommendation message can be created that includes a set of criteria for improving the prioritization score for the at least one scored entity. The electronic recommendation message can be transmitted to the at least one scored entity.

Consistent with embodiments, a system can be used for analyzing a set of prioritization scores corresponding to respective scored entities and developed from criteria comparison matrices that compare how well pairs of scored entities match respective criteria. The system can include at least one computer processor circuit that is configured to access a database to retrieve the set of prioritization scores and to determine, for at least one of the scored entities and based upon the retrieved set of prioritization scores, a numerical difference between a first prioritization score of the at least one scored entity and a threshold prioritization score. The at least one computer processor circuit can also be configured to determine, for a plurality of state changes to the criteria comparison matrices, corresponding changes to the first prioritization score and to select, based upon a comparison between the changes to the first prioritization score and the numerical difference, a subset of the plurality of state changes. The at least one computer processor circuit can also be configured to create, using the subset of the plurality of state changes, an electronic recommendation message that includes a set of criteria for improving the prioritization score for the at least one scored entity; and transmit the electronic recommendation message to the at least one scored entity.

Consistent with embodiments, a computer program product can be used for analyzing a set of prioritization scores corresponding to respective scored entities and developed from criteria comparison matrices that compare how well pairs of scored entities match respective criteria, the computer program product comprising a computer readable storage medium having program code embodied therewith, the program code executable by a computer to: access, by a computer system, a database to retrieve the set of prioritization scores; determine, for at least one of the scored entities and based upon the retrieved set of prioritization scores, a numerical difference between a first prioritization score of the at least one scored entity and a threshold prioritization score; determine, for a plurality of state changes to the criteria comparison matrices, corresponding changes to the first prioritization score; select, based upon a comparison between the changes to the first prioritization score and the numerical difference, a subset of the plurality of state changes; create, using the subset of the plurality of state changes, an electronic recommendation message that includes a set of criteria for improving the prioritization score for the at least one scored entity; and transmit the electronic recommendation message to the at least one scored entity.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to multiple criteria decision making (MCDM), more particular aspects relate to generating recommendations or feedback for participants in MCDM. While the present disclosure is not necessarily limited to such applications, various aspects of the disclosure may be appreciated through a discussion of various examples using this context.

Consistent with embodiments of the present disclosure, a computer system can be configured to rank entities according to a set of complex criteria in order to facilitate decision making by one or more individuals. As discussed herein, the ranking can be developed from scores derived from comparison matrices that include relative comparisons between alternative options. These alternative options can be referred to as different entities. For instance, each entity may submit a proposal for obtaining the business of a decision maker. The proposals represent the alternative options for the decision maker to select between.

While a more nuanced selection decision can be achieved by using more complex sets of input data with more criteria and more information about the criteria and alternative options, aspects of the present disclosure are based upon a recognition that increased complexity of the decision making process can obfuscate the reasons behind the results of the MCDM scoring. As discussed herein, the ability to provide transparency behind the basis of the results in the form of a feedback mechanism can serve a variety of different purposes. More particular aspects relate to different manners of providing feedback on the effect of changes in entities status relative to various criteria matrices used to generate the MCDM-based scores.

Certain embodiments are directed toward a system that is designed to generate a set of recommendations that can be used by entities being scored in the MCDM process. These recommendations can be generated by identifying key contributing factors in the underlying data. For example, an MCDM can use criteria comparison matrices that can be used to assess how well entities matching various criteria, relative to one another. Changes to the comparison matrices can be categorized by calculating their respective effect on the scoring of an entity. In particular embodiments, the changes can be based upon a quantized set of comparison values used in the comparison matrices. Each value can be considered a state, and the system can be configured to determine the effect of state changes on the score of the entity in question.

A particular example of an MCDM is analytic hierarchy process (AHP). AHP uses pair wise comparison to calculate the ratio scales for qualitative criteria such as inattentiveness, satisfaction, or other criteria. The values for quantitative criteria, such as cost or return on investment (ROI), can be directly used to calculate the ratio scales. AHP can be useful for reducing subjective judgment errors and increasing the likelihood that the results used to make a decision are reliable. As part of the AHP, the criteria themselves can be pairwise compared to create a criteria comparison matrix. Candidate entities can be pairwise compared for each criteria to create a set of entity comparison matrices. Each entity comparison matrix is used to calculate a prioritization vector by taking a normalized Eigen vector of each entity's comparison matrices. Each prioritization vector can then be adjusted for the criterion prioritization vector and summed up to produce total prioritization vector, which is the final prioritization result or score.

Consistent with embodiments, pairwise comparisons can be done using a quantized scale of values. For example, a scale of values could include odd integers between 1 and 9 with a selection for either of the compared items. Selecting the integer "1" results in the items having equal score or weight. Selecting increasingly higher values for either of the items can represent that the selected item has a correspondingly increasing importance. More particularly, selecting a "9" for a first item would represent the item having the highest importance relevant to the second item. Selecting a "3" for the second item, would represent the second item having moderately more importance than the first item, and so forth. Each potential selection on the scale can be referred to as a different "state" for the corresponding comparison matrix.

Consistent with various embodiments, the decision on alternative options can refer to, but is not limited to, software project proposals, stakeholder requests or market requirements. The transparency of the selection/prioritization process can be particularly useful for the individuals making the selection as well as for individuals responsible for oversight of the process. Such transparency can also be used to provide electronic recommendation messages that clarify why a particular entity was are rejected. This may provide useful guidance to an entity that allows them to strengthen their current or future proposals, and can raise the overall quality of future proposals.

Figure 1:
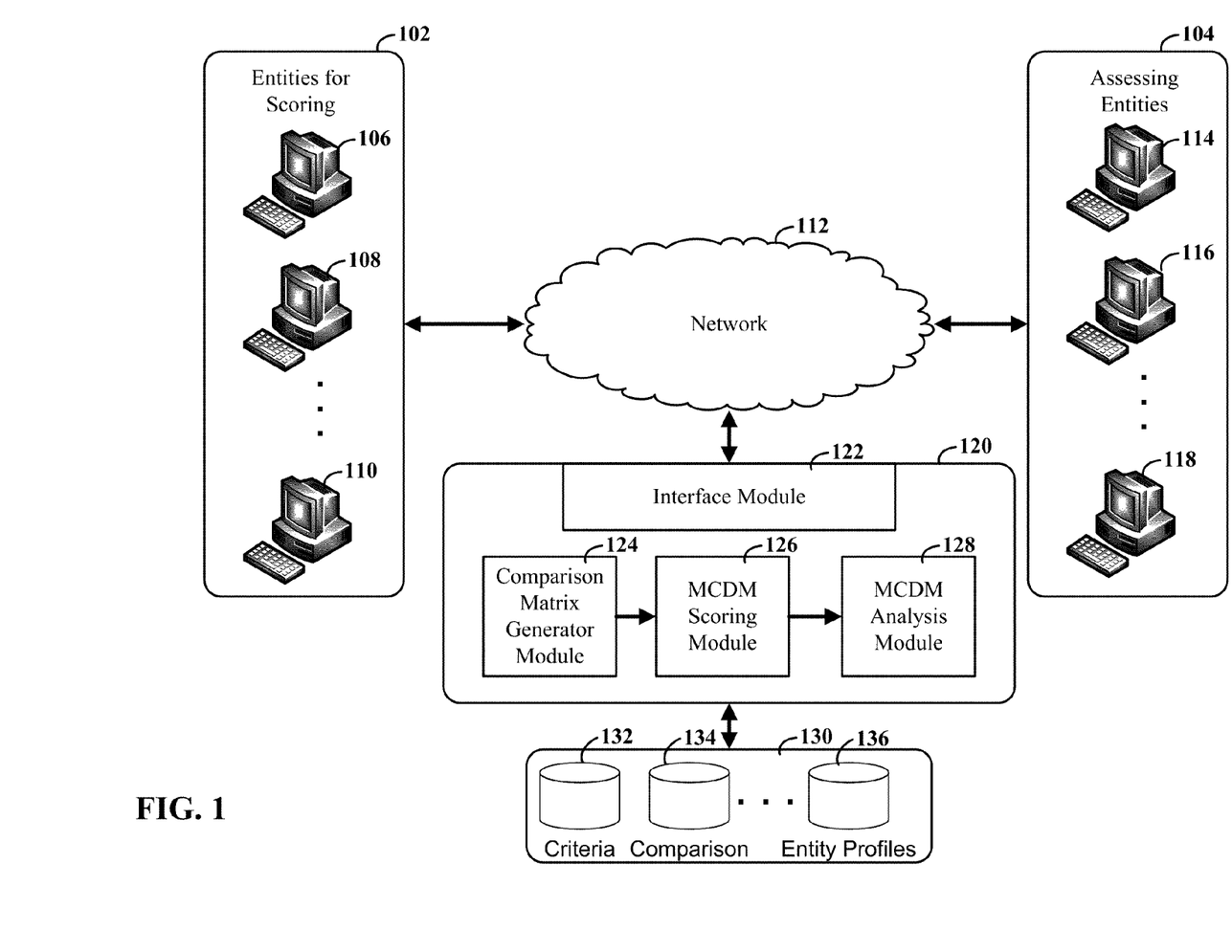
FIG. 1 depicts a diagram of a computer system for generating and analyzing multiple criteria decision making (MCDM) processes and results, consistent with embodiments of the present disclosure.

Turning now to the figures, FIG. 1 depicts a diagram of a system for generating and analyzing MCDM processes and results, consistent with embodiments of the present disclosure. The system can be configured to select between alternative options submitted or otherwise corresponding to, a set of entities for scoring 102. For example, the entities 106, 108, 110 can submit competing proposals for a contract. A set of assessing entities 104 (e.g., one or more assessing entities 114, 116, 118) can be tasked with selecting a proposal from the submitting entities 106, 108, 110. Consistent with embodiments, the assessing entities can base their selections on scoring generated by an MCDM process. According to embodiments, the MCDM process can be carried out using a computer system 120, which can be particularly useful for complex decisions relying upon a large number of different criteria and proposal submitting entities. As discussed herein, the computer system 102 can include one or more computer processor circuits and computer readable storage devices. The various components can communicate over network 112. Network 112 can include, but is not necessarily limited to, local area network(s) (LANs), wide area networks (WANs), the global Internet, proprietary networks, private networks and combinations thereof.

Computer system 120 can include one or more computer processor circuits, logic circuits and memory circuits that are configured to provide an interface with external systems and to carry out an MCDM process. For instance, the system 120 can be configured to provide an interface module 122. Interface module 122 can be designed to communicate with both the set of entities for scoring 102 and the assessing entities 104. Using interface module 122, the assessing entities 104 can be provided with the results of the MCDM process (scoring of the entities/proposals 102). In embodiments, interface module 122 can be configured to allow assessing entities 104 to provide information used in the MCDM process. For example, the assessing entities 104 could provide a list of criteria as well as rankings for the relevance of the criteria. The assessing entities 104 could also provide information about rankings for each of the entities for scoring 102, such as providing relative/comparative rankings for the entities and for different criteria.

Consistent with embodiments, the entities for scoring 102 can submit alternatives for scoring by the computer system 120. Their submissions can include various data relating to the criteria used in the MCDM process. The computer system 120 can store such data in one or more databases 130. For instance, a criteria database 132 can store data that defines the relevant criteria in terms of scope and importance. Comparison database 134 can store data relating to pairwise comparisons between criteria and the entities for scoring 102. Entity profile database 136 can store information about the entities. For instance, the entities for scoring might submit multiple proposals over a period of time and the entity profile database 136 can store data about each entity so that the information does not have to be reproduced for each proposal (e.g., contact information, regulatory/compliance status and past proposal completion/satisfaction history). Additional data and databases are also possible. Moreover, although certain types of information are depicted as being stored in multiple databases, the information can be stored in less databases, or even in single database.

Consistent with embodiments, the computer system 120 can be configured to include a comparison matrix generator module 124. The comparison matrix generator module 124 can generate a set of matrices that represent the relative importance of different criteria and a set of matrices that represent the relative matching of different entities to the different criteria. For example, the computer system 120 can be configured to apply AHP to a decision of choice. The matrices can each represent pairwise comparisons between the elements being compared. A quantized comparison metric can be used to represent the comparisons within the matrices. The matrices can be normalized and the eigenvector can be used to generate a set of priority vectors.

According to various embodiments, the computer system 120 can include an MCDM scoring module 126. The MCDM scoring module 126 can be configured to generate scoring values for each of the entities 102. These values can be provided to the assessing entities 104, which can select one or more of the entities 102 based upon their relative scores. Using AHP as an example, the MCDM scoring module 126 can be configured to use the priority vectors to generate the score for each alternative option/proposal/entity.

Aspects of the present disclosure are directed toward an intelligent analysis of the scoring results from an MCDM. The analysis can be used by assessing entities 104, scored entities 102, or both. Accordingly, the computer system 120 can be configured to include an MCDM analysis module 128. Complex MCDM decisions can include a large number of criteria and entities or proposals, which can result in a complex set of inter-relationships. The MCDM analysis module can be designed to identify a subset of input elements (e.g., criteria and hypothetical changes in states of the comparison matrices) that are used to generate the scoring results. The resulting subsets can then be analyzed in the context of the selection process/results and communicated to the appropriate party. This type of targeted feedback can be particularly useful for improving the transparency of the process and thereby allowing for more intelligent decisions to be made by the corresponding entities.

Using AHP as an example, the selection (or filtering) of input elements to the MCDM can be based upon the relative changes in the final scoring for an entity being analyzed that are caused by particular state changes in the underlying comparison matrices. Under certain embodiments, the MCDM analysis module can calculate score distributions for state changes. State changes with relatively small contributions or effects on the final scoring can be disregarded to allow for the focus to be placed on state changes with larger contributions.

Various embodiments of the present disclosure are directed toward filtering input elements based upon a comparison between a final score of an entity being analyzed to a threshold final score value. For example, the threshold value may represent the cutoff for selection of an alternative option (e.g., acceptance of a proposal). Thus, had the entity being analyzed achieved the threshold value, they would have been selected, given the MCDM and current set of options and criteria. The MCDM analysis module can be configured to determine a gap score based upon the difference between the actual score of the entity being analyzed and the threshold value. The state changes of input elements can then be selected based upon whether or not they would have been sufficient to overcome the gap score, and thereby, result in the selection of the entity being analyzed. This can be particularly useful for presenting the relevant parties with focused feedback on how decisions of the MCDM process were reached and highlight likely candidate criteria for improving scores in the future.

Figure 2:
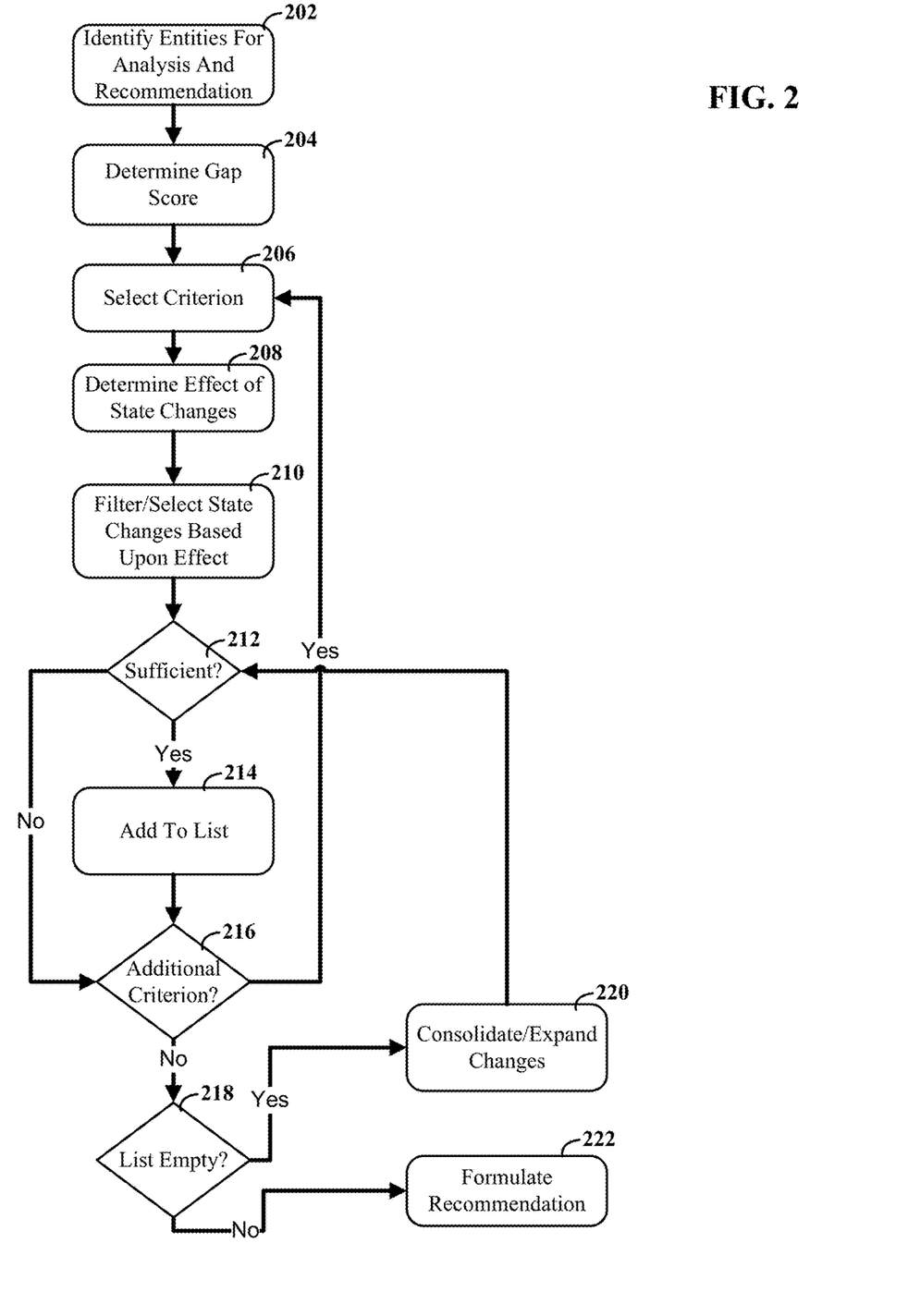
FIG. 2 depicts a flow diagram for analyzing an MCDM process, consistent with embodiments of the present disclosure.

FIG. 2 depicts a flow diagram for analyzing an MCDM process, consistent with embodiments of the present disclosure. As discussed herein, the flow can be carried out using a computer system, such as the systems described in connection with the figures herein. At block 202, the system can select one or more entities for analysis or recommendation. For example, the system might select entities that were only marginally rejected, as evidenced by their MCDM score being close to the cutoff value for the lowest score of any selected entity. Selection of other entities is also possible. For example, selection might be in response to a request by an entity that seeks information on how to improve their proposals in the futures, or an assessing entity may seek data on what criteria were most relevant to scores of a specific scored entity.

The selection of a marginally rejected entities can be particularly useful because they are often the next best candidates, and may even surpass currently selected candidates with minimal changes and effort. Accordingly, it can be important for marginally rejected candidate entities to be provided with an electronic recommendation message that includes data identifying missed opportunities of their proposals in an efficient and easily understandable manner.

Once the entities are selected, the gap score can be determined for the selected entities, as shown by block 204. For example, the gap score can be calculated by finding the numerical difference between the score of an entity and a threshold score. The threshold score can be selected based upon a relevant score for the selection process, such as the score for the lowest selected entity or a predefined threshold score. This particular gap score would reflect the amount that the score would need to change in order for the particular entity to have been selected, assuming all other factors remain unchanged.

The system can then select a particular criterion, as shown by block 206. In certain embodiments, the system can be configured to select each and every criterion sequentially. In certain embodiments, the system can be configured to select from a subset of all available criteria. For instance, the system may exclude criteria that are unlikely, or impossible, to change for the entity being analyzed. This might include criteria such as physical location (e.g., assuming that it is unlikely that an entity will relocate), state or country of incorporation for a company, tax status or other considerations that might be difficult to modify. In some instances, the system can be designed to allow the assessing entities to manually select such criterion for analysis. The system can also be configured to automatically identify the subset of criteria using, for example, profile data from the entities to determine which criteria should be analyzed.

The system can be configured to determine the effect of state changes for the selected criterion, as shown by block 208. More particularly, the system can calculate how much the final score of the entity being analyzed would change in response to transitions between sequential states for the criterion. As an example, for AHP a pairwise comparison between each entity can be represented by values on a quantized scale (e.g., odd integer values from 1 to 9). A state change can represent movement between sequential values on the quantized scale and for a particular pairwise comparison between entities.

Consistent with embodiments, the system can determine the effect of state changes by calculating the MCDM value for each state change, while keeping other variables and states unchanged.

Once the state change effects are determined, the system can filter or select certain state changes, as shown by block 210. This filtering can be based upon the relative amount of change each state change has to the final scoring. For instance, the filtering can select the three state changes that contribute the most to the final scoring. More or less state changes can be selected based upon factors such as the how evenly their contributions to the final score are distributed.

The system can then verify whether or not the filtered state changes are sufficient to overcome the gap score, as depicted in block 212. For state changes that are sufficient, they can be added to the list, per block 214. For state changes that are not sufficient, the flow can proceed to block 216 where it can be determined whether or not there are additional criterion to analyze. If there are additional criterion, they can be selected in block 206 and analyzed as discussed above. If not, then the system can determine whether or not the list of criterion is empty (or above a threshold number). If the list is not empty (or is above a threshold number), then the criterion on the list can be used to formulate a recommendation for improving the entities score, per block 222. If the list is empty, then the system can (optionally) attempt to expand or consolidate the state changes and re-analyze accordingly, per block 220. For example, the system could group two or more criterion together so that the combined effects of their state changes is sufficient relative to the gap score.

Figure 3:
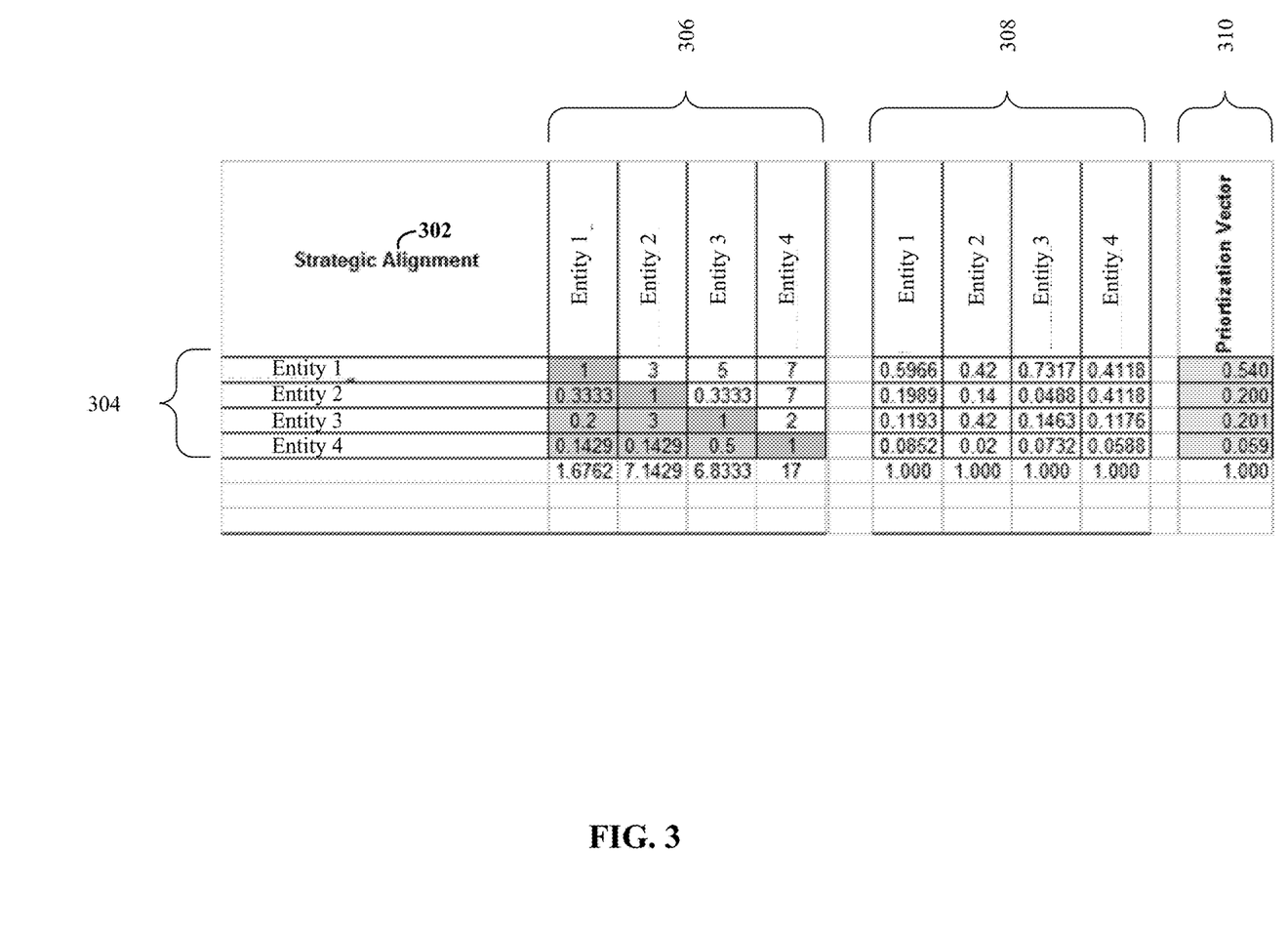
FIG. 3 depicts a block diagram of a comparison matrix and prioritization vector, consistent with embodiments of the present disclosure.

FIG. 3 depicts a block diagram of a comparison matrix and prioritization vector, consistent with embodiments of the present disclosure. For instance, the comparison matrix example is for the criterion 302, identified simply as ""strategic alignment." As discussed herein, the criterion can be any number of different aspects selected by the assessing entities.

As a non-limiting example, the comparison matrix of FIG. 3 is consistent with AHP using a quantized comparison scale that includes the values: {⅑, ⅐, ⅕, ⅓, 1, 3, 5, 7, 9}, where "1" represents no preference, fractional numbers represent a preference of the entity in the columns and integers greater than one represent preference of the entity in the rows. For instance, the first matrix includes entities 1-4 in both the rows 304 and the columns 306. The intersection of the same entity results in the diagonally values of "1" because there is no preference of the entity over itself. As shown in the example, however, entity 1 is preferred by a 3 to 1 margin over entity 2. This is represented by the value of "3" in the first row and second column as well as the value of "0.3333" (or ⅓) in the second row and first column.

The second set of columns 308 represent a normalization of the values from the first set of columns 306. The eigenvalue of the second set of columns can then be used to generate the prioritization vector 310, which is also a normalized value.

A corresponding comparison matrix and prioritization vector can be generated for each different criterion. Moreover, the number of entities can increased or decreased depending upon the particular decision being made. Other embodiments also allow for a different quantized scale to be used to generate the comparison matrices.

Figure 4:
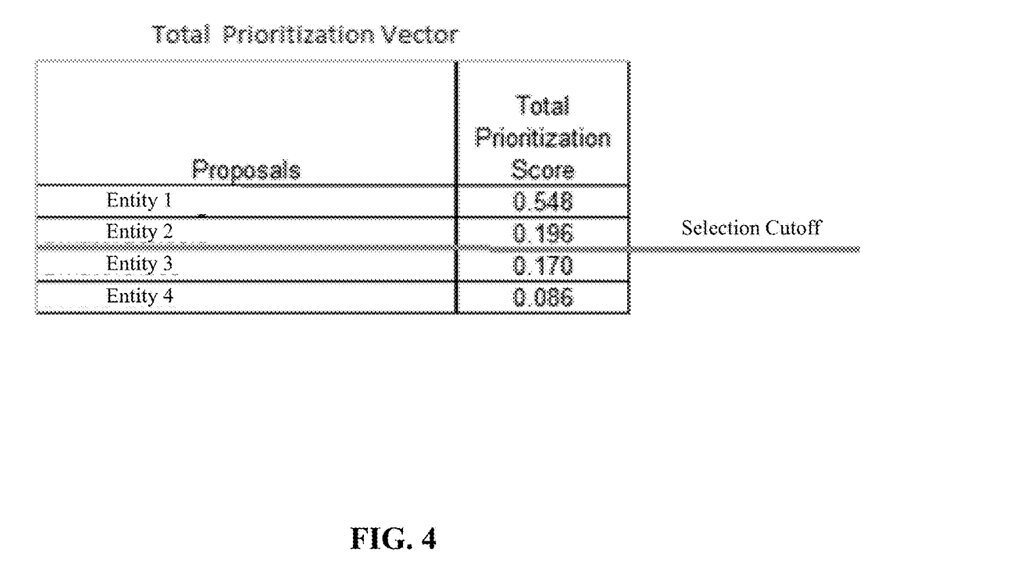
FIG. 4 depicts a total prioritization vector, consistent with embodiments of the present disclosure.

FIG. 4 depicts a total prioritization vector, consistent with embodiments of the present disclosure. The total prioritization score for each entity can be determined using the prioritization vector from each of the comparison matrices. As discussed herein, the relative weight of each prioritization vector on the total score can be generated using matrices that represents a pairwise comparison between each criterion and their relative importance. As shown in FIG. 4, each entity can be given a total prioritization score, where a large score represents a better option. In the example of FIG. 4, only the top two entities were selected. Thus, the value of the last entity selected represents the selection cutoff value. This value can be used as the threshold value from which the gap score is determined. For example, the gap score for entity 3 is 0.196−0.170=0.026.

Figure 5:
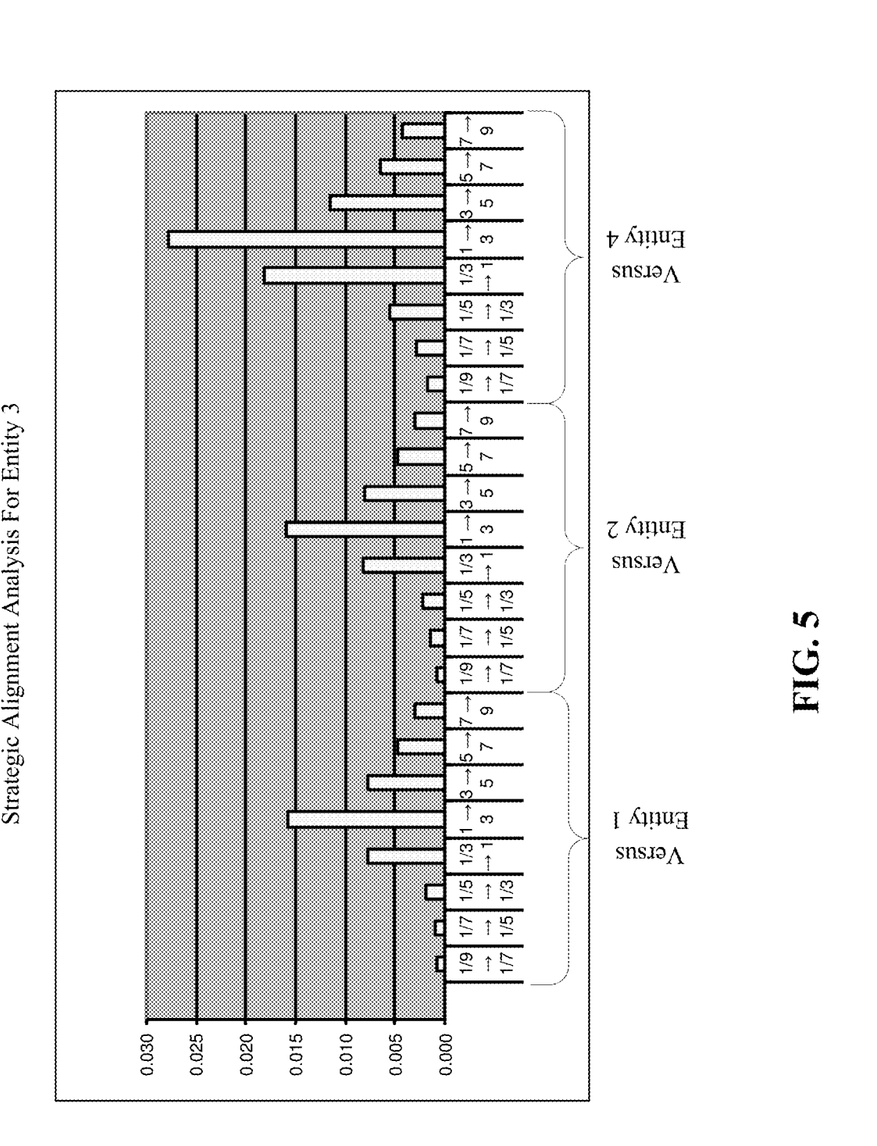
FIG. 5 is a diagram for a distribution of total score effects for state changes, consistent with embodiments of the present disclosure.

FIG. 5 is a diagram for a distribution of total score effects for state changes, consistent with embodiments of the present disclosure. A similar diagram can be generated for each criterion and used during the selection and filtering of state changes and criteria, as discussed herein.

The diagram depicts a distribution of total prioritization score contributions for state transitions of entity 3 relative to each of the other entities and for a particular criterion. The horizontal axis shows potential state changes for values in a comparison matrix from the perspective of entity 3. The vertical axis represents the change (or delta) in overall prioritization score that results from the corresponding state change. In this manner, state changes can be identified relative to their corresponding potential improvement of overall score of entity 3. For instance, state changes "⅓ to 1" and "1 to 3" and "3 to 5" contribute a signification portion (e.g., ~80%) of total prioritization score that is provided by this criterion. In this particular example, these particular state changes are relatively significant contributors with respect to each of the entities; however, contributions can vary according each entity depending upon the underlying comparison matrices of the MCDM. For instance, the state change "⅕ to ⅓" might be a significant contributor with respect to a first entity but not for a second entity.

Consistent with certain embodiments, the system can be configured to select a subset of the state changes for gap analysis based upon their relative contributions to the total prioritization score. For instance, the system could select the top three contributors for each entity or the contributors that make up the top threshold percentage (e.g., the top 80%).

Although various examples discussed herein refer to AHP, other MCDM processes that apply quantitative values for preferences between alternatives, are possible. For instance, various embodiments can be used with MCDM methods such as Weighted Sum Model (WSM) and Weighted Product Model (WPM). For example, in WSM each criterion is given a weight and each alternatives are assigned a value against each criteria. The MDSM score is calculated as sum of products of items values and criterion weight. As discussed herein, system can be configured to analyze how state changes in these values affect the final prioritization score and provide feedback based upon the analysis.

Figure 6:
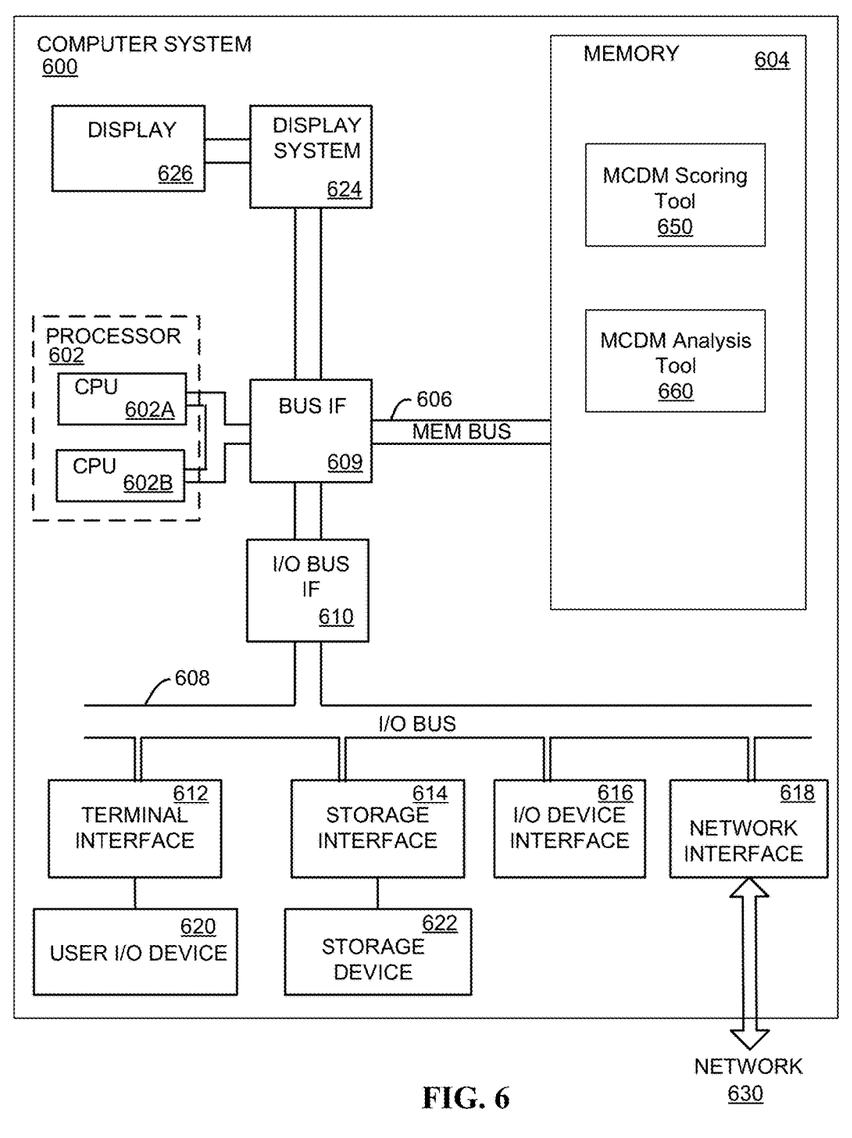
FIG. 6 depicts a high-level block diagram of a computer system for implementing various embodiments.

FIG. 6 depicts a high-level block diagram of a computer system 600 for implementing various embodiments. The mechanisms and apparatus of the various embodiments disclosed herein apply equally to any appropriate computing system. The major components of the computer system 600 include one or more processors 602, a memory 604, a terminal interface 612, a storage interface 614, an I/O (Input/Output) device interface 616, and a network interface 618, all of which are communicatively coupled, directly or indirectly, for inter-component communication via a memory bus 606, an I/O bus 608, bus interface unit 609, and an I/O bus interface unit 610.

The computer system 600 may contain one or more general-purpose programmable central processing units (CPUs) 602A and 602B, herein generically referred to as the processor 602. In embodiments, the computer system 600 may contain multiple processors; however, in certain embodiments, the computer system 600 may alternatively be a single CPU system. Each processor 602 executes instructions stored in the memory 604 and may include one or more levels of on-board cache.

In embodiments, the memory 604 may include a random-access semiconductor memory, storage device, and/or storage medium (either volatile or non-volatile) for storing and/or encoding data and programs. In certain embodiments, the memory 604 represents the entire virtual memory of the computer system 600, and may also include the virtual memory of other computer systems coupled to the computer system 600 or connected via a network. The memory 604 can be conceptually viewed as a single monolithic entity, but in other embodiments the memory 604 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 604 may store all or a portion of the various programs, modules and data structures for processing data transfers as discussed herein. For instance, the memory 604 can MCDM scoring tool or module 650 and/or MCDM analysis tool or module 660. Consistent with certain embodiments, these tools can be implemented as part of one or more monitor threads. These programs and data structures are illustrated as being included within the memory 604 in the computer system 600, however, in other embodiments, some or all of them may be on different computer systems and may be accessed remotely, e.g., via a network. The computer system 600 may use virtual addressing mechanisms that allow the programs of the computer system 600 to behave as if they only have access to a large, single storage entity instead of access to multiple, smaller storage entities. Thus, while the MCDM scoring tool 650 and the MCDM analysis tool 660 are illustrated as being included within the memory 604, these components are not necessarily all completely contained in the same storage device at the same time. Further, although the MCDM scoring tool 650 and the MCDM analysis tool 660 are illustrated as being separate entities, in other embodiments some of them, portions of some of them, or all of them may be packaged together (e.g., as part of the same monitor thread).

In embodiments, the MCDM scoring tool 650 and the MCDM analysis tool 660 may include instructions or statements that execute on the processor 602 or instructions or statements that are interpreted by instructions or statements that execute on the processor 602 to carry out the functions as further described below. In certain embodiments, the MCDM scoring tool 650 and the MCDM analysis tool 660 can be implemented in hardware via semiconductor devices, chips, logical gates, circuits, circuit cards, and/or other physical hardware devices in lieu of, or in addition to, a processor-based system. In embodiments, the MCDM scoring tool 650 and the MCDM analysis tool 660 may include data in addition to instructions or statements.

The computer system 600 may include a bus interface unit 609 to handle communications among the processor 602, the memory 604, a display system 624, and the I/O bus interface unit 610. The I/O bus interface unit 610 may be coupled with the I/O bus 608 for transferring data to and from the various I/O units. The I/O bus interface unit 610 communicates with multiple I/O interface units 612, 614, 616, and 618, which are also known as I/O processors (IOPs) or I/O adapters (IOAs), through the I/O bus 608. The display system 624 may include a display controller, a display memory, or both. The display controller may provide video, audio, or both types of data to a display device 626. The display memory may be a dedicated memory for buffering video data. The display system 624 may be coupled with a display device 626, such as a standalone display screen, computer monitor, television, or a tablet or handheld device display. In one embodiment, the display device 626 may include one or more speakers for rendering audio. Alternatively, one or more speakers for rendering audio may be coupled with an I/O interface unit. In alternate embodiments, one or more of the functions provided by the display system 624 may be on board an integrated circuit that also includes the processor 602. In addition, one or more of the functions provided by the bus interface unit 609 may be on board an integrated circuit that also includes the processor 602.

The I/O interface units support communication with a variety of storage and I/O devices. For example, the terminal interface unit 612 supports the attachment of one or more user I/O devices 620, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 620 and the computer system 600, and may receive output data via the user output devices. For example, a user interface may be presented via the user I/O device 620, such as displayed on a display device, played via a speaker, or printed via a printer.

The storage interface 614 supports the attachment of one or more disk drives or direct access storage devices 622 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 622 may be implemented via any type of secondary storage device. The contents of the memory 604, or any portion thereof, may be stored to and retrieved from the storage device 622 as needed. The I/O device interface 616 provides an interface to any of various other I/O devices or devices of other types, such as printers or fax machines. The network interface 618 provides one or more communication paths from the computer system 600 to other digital devices and computer systems; these communication paths may include, e.g., one or more networks 630.

Although the computer system 600 shown in FIG. 6 illustrates a particular bus structure providing a direct communication path among the processors 602, the memory 604, the bus interface 609, the display system 624, and the I/O bus interface unit 610, in alternative embodiments the computer system 600 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 610 and the I/O bus 608 are shown as single respective units, the computer system 600 may, in fact, contain multiple I/O bus interface units 610 and/or multiple I/O buses 608. While multiple I/O interface units are shown, which separate the I/O bus 608 from various communications paths running to the various I/O devices, in other embodiments, some or all of the I/O devices are connected directly to one or more system I/O buses.

In various embodiments, the computer system 600 is a multi-user mainframe computer system, a single-user system, or a server computer or similar device that has little or no direct user interface, but receives requests from other computer systems (clients). In other embodiments, the computer system 600 may be implemented as a desktop computer, portable computer, laptop or notebook computer, tablet computer, pocket computer, telephone, smart phone, or any other suitable type of electronic device.

FIG. 6 depicts a representative of certain major components of the computer system 600. Individual components, however, may have greater complexity than represented in FIG. 6, components other than or in addition to those shown in FIG. 6 may be present, and the number, type, and configuration of such components may vary. Several particular examples of additional complexity or additional variations are disclosed herein; these are by way of example only and are not necessarily the only such variations. The various program components illustrated in FIG. 6 may be implemented, in various embodiments, in a number of different manners, including using various computer applications, routines, components, programs, objects, modules, data structures, etc., which may be referred to herein as "software," "computer programs," or simply "programs."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method of analyzing a set of prioritization scores corresponding to respective scored entities and developed from criteria comparison matrices that compare how well pairs of scored entities match respective criteria, the method comprising:

accessing, by a computer system, a database to retrieve the set of prioritization scores;

determining, for at least one of the scored entities having a first prioritization score below a first threshold prioritization score and based upon the set of prioritization scores, a numerical difference between the first prioritization score and the first threshold prioritization score;

determining, for a first plurality of state changes to the criteria comparison matrices, first corresponding changes to the first prioritization score;

determining, for a second plurality of state changes to the criteria comparison matrices, second corresponding changes to the first prioritization score;

generating, using the first corresponding changes and using the second corresponding changes, a numeric distribution indicating relative numeric contributions of at least the first plurality of state changes and the second plurality of state changes to reducing the numeric difference;

selecting, based on the numeric distribution indicating that relative numeric contributions of the first corresponding changes to reducing the numeric difference is greater than a second threshold value and relative numeric contributions of the second corresponding changes to reducing the numeric difference is less than the second threshold value, the first plurality of state changes;

generating, an electronic recommendation message that recommends using the first plurality of state changes to improve the first prioritization score for the at least one scored entity; and transmitting the electronic recommendation message.

2. The method of claim 1, wherein the first threshold prioritization score is determined by a prioritization score for another scored entity.

3. The method of claim 1, wherein selecting the first plurality of state changes includes determining that the first corresponding changes to the first prioritization score are more than the numerical difference.

4. The method of claim 1, wherein the set of prioritization scores are generated using analytic hierarchy process (AHP) in which alternatives for reaching a decision are assigned relative pairwise preferences to one another and for each criteria.

5. The method of claim 4, wherein the first plurality of state changes to the comparison matrices include state changes to the relative pairwise preferences between the at least one scored entity and a second scored entity.

6. The method of claim 1, wherein selecting the first plurality of state changes includes selecting from potential improvements to quantized values in the criteria comparison matrices and for the at least one scored entity.

7. The method of claim 1, wherein the criteria comparison matrices compare how well pairs of scored entities match respective criteria using a quantized scale in which an increasing value represents a preference for the at least one scored entity relative to another entity.

8. The method of claim 7, wherein the first plurality of state changes includes one or more increases in value in a preference for the at least one scored entity.

9. The method of claim 1, further comprising filtering, before selecting the first plurality of state changes, the plurality of state changes based upon a relative contribution to the first prioritization score.

10. A system for analyzing a set of prioritization scores corresponding to respective scored entities and developed from criteria comparison matrices that compare how well pairs of scored entities match respective criteria, the system comprising:

at least one computer processor circuit configured to:

access a database to retrieve the set of prioritization scores;

determine, for at least one of the scored entities having a first prioritization score below a first threshold prioritization score and based upon the set of prioritization scores, a numerical difference between the first prioritization score and the first threshold prioritization score;

determine, for a first plurality of state changes to the criteria comparison matrices, first corresponding changes to the first prioritization score;

determine, for a second plurality of state changes to the criteria comparison matrices, second corresponding changes to the first prioritization score;

generate, using the first corresponding changes and using the second corresponding changes, a numeric distribution indicating relative numeric contributions of at least the first plurality of state changes and the second plurality of state changes to reducing the numeric difference;

select, based on the numeric distribution indicating that relative numeric contributions of the first corresponding changes to reducing the numeric difference is greater than a second threshold value and relative numeric contributions of the second corresponding changes to reducing the numeric difference is less than the second threshold value, the first plurality of state changes;

generate an electronic recommendation message that recommends using the first plurality of state changes in a set of criteria for improving the first prioritization score for the at least one scored entity; and transmit the electronic recommendation message to the at least one scored entity.

11. The system of claim 10, wherein the first threshold prioritization score is determined by a prioritization score for another scored entity.

12. The system of claim 10, wherein selecting the first plurality of state changes includes determining that the first corresponding changes to the first prioritization score are more than the numerical difference.

13. The system of claim 10, wherein the at least one computer processor circuit is further configured to generate the set of prioritization scores using analytic hierarchy process (AHP) in which alternatives for reaching a decision are assigned relative pairwise preferences to one another and for each criteria.

14. The system of claim 13, wherein the first plurality of state changes to the comparison matrices include state changes to the relative pairwise preferences between the at least one scored entity and another scored entity.

15. A computer program product for analyzing a set of prioritization scores corresponding to respective scored entities and developed from criteria comparison matrices that compare how well pairs of scored entities match respective criteria, the computer program product comprising a computer readable storage medium having program code embodied therewith, the program code executable by a computer to:

access a database to retrieve the set of prioritization scores;

determine, for at least one of the scored entities having a first prioritization score below a first threshold prioritization score and based upon the set of prioritization scores, a numerical difference between the first prioritization score and the first threshold prioritization score;

determine, for a first plurality of state changes to the criteria comparison matrices, first corresponding changes to the first prioritization score;

determine, for a second plurality of state changes to the criteria comparison matrices, second corresponding changes to the first prioritization score;

generate, using the first corresponding changes and using the second corresponding changes, a numeric distribution indicating relative numeric contributions of at least the first plurality of state changes and the second plurality of state changes to reducing the numeric difference;

select, based on the numeric distribution indicating that relative numeric contributions of the first corresponding changes to reducing the numeric difference is greater than a second threshold value and relative numeric contributions of the second corresponding changes to reducing the numeric difference is less than the second threshold value, the first plurality of state changes;

generate an electronic recommendation message that recommends using the first plurality of state changes to improve the first prioritization score for the at least one scored entity; and transmit the electronic recommendation message to the at least one scored entity.

16. The computer program product of claim 15, wherein the first threshold prioritization score is based upon a prioritization score for another scored entity.

17. The computer program product of claim 15, wherein program code executable by a computer is further configured to select the first plurality of state changes by determining that the first corresponding changes to the first prioritization score are more than the numerical difference.

* * * * *